United States Patent [19]

Anderson et al.

[11] Patent Number: 4,692,806
[45] Date of Patent: Sep. 8, 1987

[54] IMAGE-DATA REDUCTION TECHNIQUE

[75] Inventors: Charles H. Anderson, Somerset County; Curtis R. Carlson, Mercer County, both of N.J.

[73] Assignee: RCA Corporation, Princeton, N.J.

[21] Appl. No.: 850,432

[22] Filed: Apr. 8, 1986

Related U.S. Application Data

[63] Continuation-in-part of Ser. No. 698,787, Feb. 6, 1983, abandoned.

[30] Foreign Application Priority Data

Jul. 25, 1985 [GB] United Kingdom ................. 8518803

[51] Int. Cl.$^4$ ............................................... H04N 5/30
[52] U.S. Cl. .................................... 358/209; 358/108; 358/126; 358/166
[58] Field of Search ................ 358/209, 125, 126, 180, 358/93, 108, 166, 107, 109, 21 R, 167, 133, 105, 903, 160; 382/47, 43, 54; 364/521; 901/47

[56] References Cited

U.S. PATENT DOCUMENTS

| | | | |
|---|---|---|---|
| 3,016,518 | 1/1962 | Taylor | 358/209 X |
| 3,983,328 | 9/1976 | Newell | 358/180 X |
| 4,028,225 | 6/1977 | Lewis | 358/107 X |
| 4,405,943 | 9/1983 | Kanaly | 358/133 |
| 4,513,317 | 4/1985 | Ruoff, Jr. | 358/133 |
| 4,523,230 | 6/1985 | Carlson et al. | 358/167 |

OTHER PUBLICATIONS

C. H. Anderson, et al., "Change Detection and Tracking Using Pyramid Transform Techniques," Proceedings of the SPIE Conference on Intelligent Robots and Computer Vision, Boston, Sep. 1985, pp. 1–7.

C. H. Anderson, et al., "A Pyramid Based Smart Surveillance Camera," Proceedings of First Annual Symposium on Physical/Electronic Security, Philadelphia, Aug. 1985, pp. 11-1-11-6.

*Primary Examiner*—James J. Groody
*Assistant Examiner*—Victor R. Kostak
*Attorney, Agent, or Firm*—Allen LeRoy Limberg; George J. Seligsohn

[57] ABSTRACT

A foveated electronic camera employing a spatial-frequency spectrum analyzer and data-reduction means utilizing movable spatial windows for converting a high-resolution, wide field-of-view image into a group of subspectrum band images ranging in resolution and field of view from a lowest-resolution image of the entire field of view to a highest-resolution image of a selectably positionable smallest spatial subregion of the entire field of view. Such a camera is useful in a surveillance camera system and in a robotic system, by way of examples.

41 Claims, 16 Drawing Figures

IMAGE-DATA REDUCTION TECHNIQUE

This is a continuation-in-part of application Ser. No. 698,787 filed on Feb. 6, 1983 and now abandoned.

This invention relates to a technique for reducing image data and, more particularly, to a foveated electronic camera which may be operated automatically and/or semi-automatically.

Complex automatically controlled systems (such as surveillance television cameras, robotic systems, target tracking systems, etc.) often require the signal processing of visual-information image samples. The total number of image picture elements (pixels) to be processed depends both on the size of the field of view of the image and the spatial resolution of the image. In order to provide a high degree of spatial resolution over all of a large field of view, an extremely large number of image pixels is required. However, it is not practical to process such a large number of image pixels.

One way of overcoming this problem (employed by the human eye) is to provide a relatively high spatial resolution in one region of the field of view of the imager (the centrally-located fovea of the retina of the eye) and a relatively low spatial resolution in another region of the field of view of the imager (the periphery of the retina of the eye)—together with the controlled movement of the imager to bring the spatial portion of an image originally within a low-resolution region of the imager into the high-resolution region of the imager. Thus, a person may move his eye and his head to observe with high resolution in the fovea an image of an object which was originally observed with low resolution near the edge of his visual field.

The purpose of the present invention is also to greatly reduce the number of image pixels to be processed, while retaining the ability to observe objects with high spatial resolution, which imaged objects can originally fall anywhere within a relatively wide field of view, most of which has only a low resolution capability. However, the image-reduction technique employed by the present invention is substantially different from that employed by the human eye.

In accordance with the principles of the present invention, an input video signal representing a relatively high-spatial-resolution, wide-field-of-view image that is comprised of a first given number of pixels is processed to reduce the image data therein. Specifically, the input video signal is first processed to derive therefrom (1) a certain output video signal representing a derived relatively low-spatial-resolution image having a given field-of-view that corresponds to the field of the image represented by the input video signal, the image represented by said certain video signal being comprised of a second given number of pixels smaller than the first given number, and (2) at least one other video signal representing a derived image having the given field-of-view, the image represented by the one other output video signal exhibiting a resolution equal to or less than the relatively high-spatial-resolution image represented by the input video signal but larger than the relatively low-spatial-resolution derived image represented by the certain output video signal. In addition, the derived image represented by this one other output video signal is comprised of a number of pixels that is equal to or less than the first given number of pixels but is larger than the second given number. This one other output video signal is then further processed to reduce the number of pixels of the derived image represented thereby by passing a spatially-localized subset of pixels thereof through a spatial window, wherein the subset is comprised of no greater number of pixels than the second given number.

IN THE DRAWING

Figure 2:
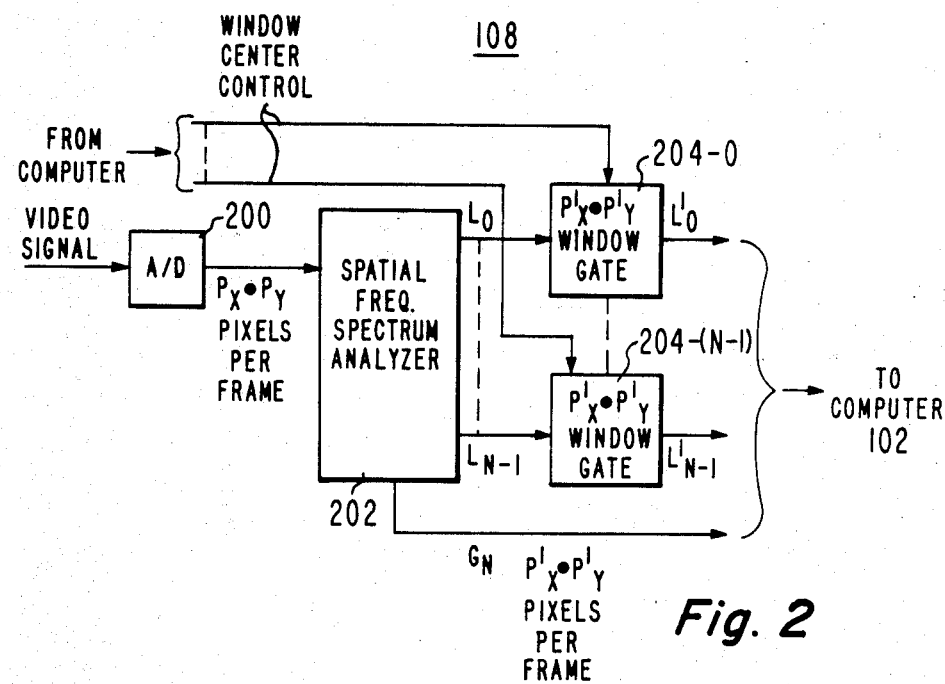
FIG. 2 is a functional block diagram of a first illustrative embodiment of the image-reduction means of FIG. 1.
Figure 4:
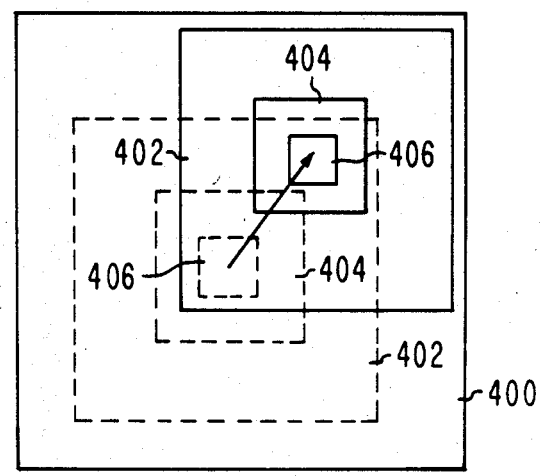
Figure 5:
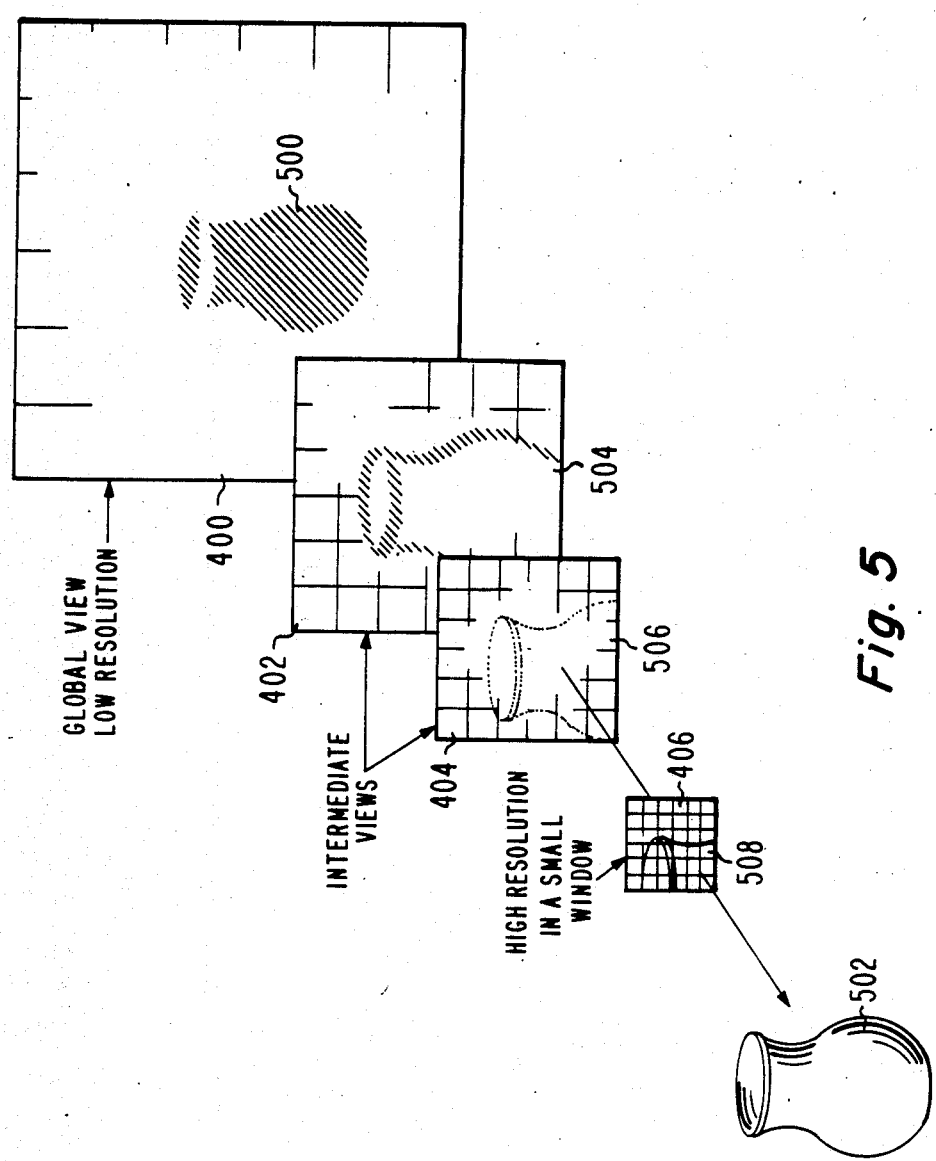

FIG. 4 diagramatically illustrates the operation of the spatially movable windows of the present invention; and FIG. 5 diagramatically illustrates the relative resolution and field of view of each of respective subspectra band images derived at the output of FIG. 2.

Figure 1:
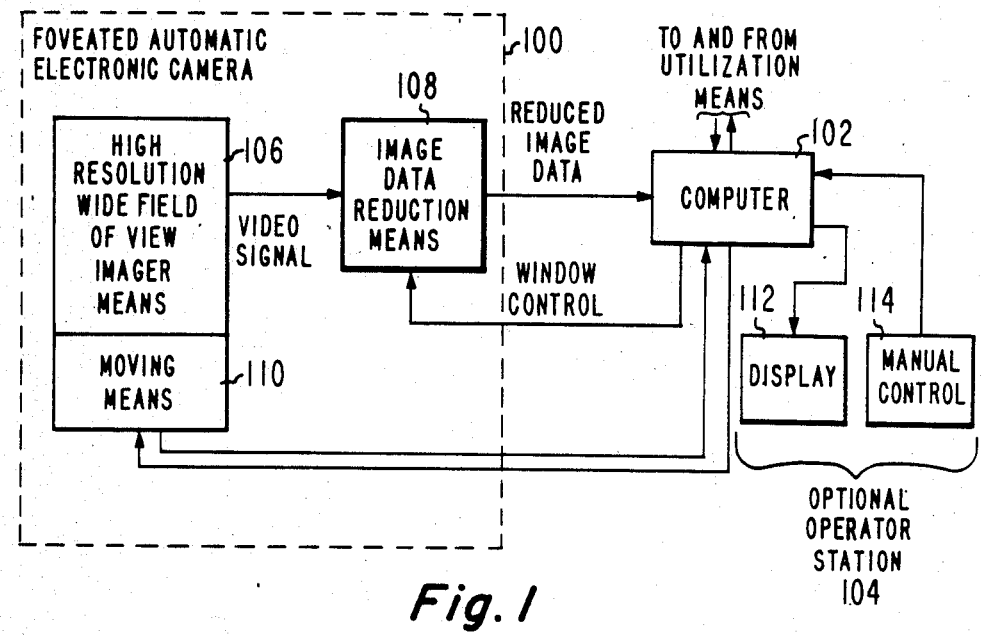
FIG. 1 is a functional block diagram of a system that employs a foveated automatic electronic camera incorporating an image-data reduction means of the present invention.
Figure 6:
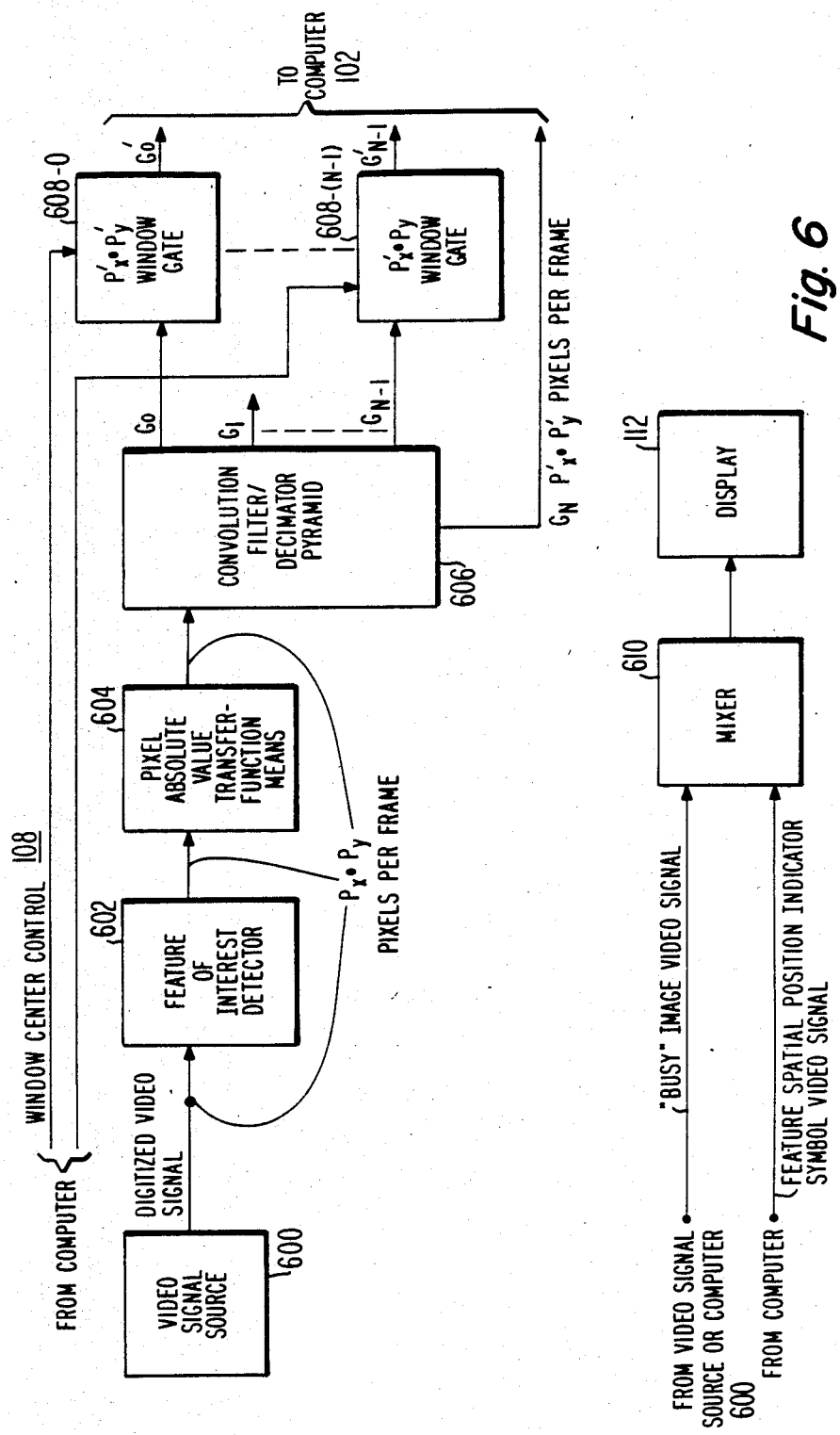
Figure 6A:
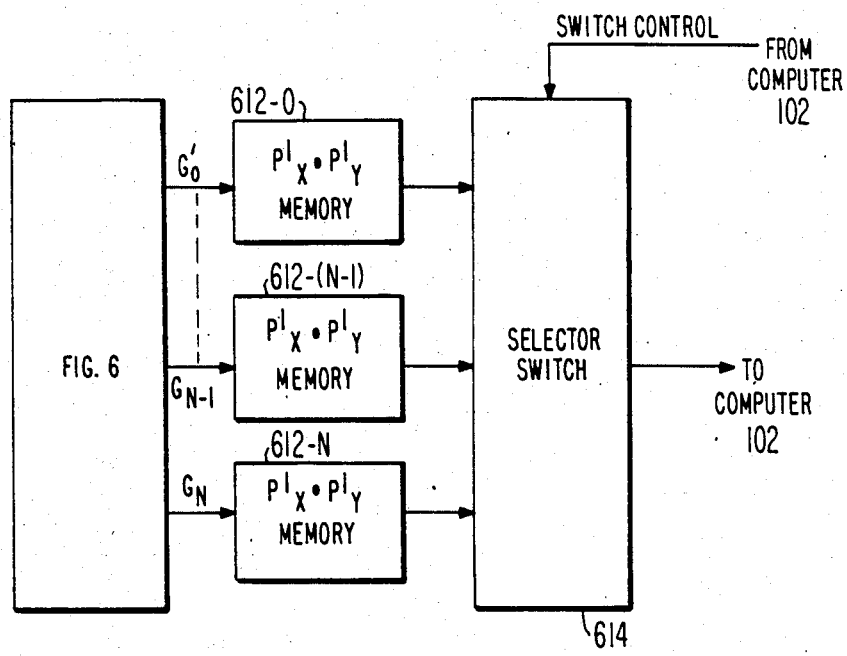
Figure 7:
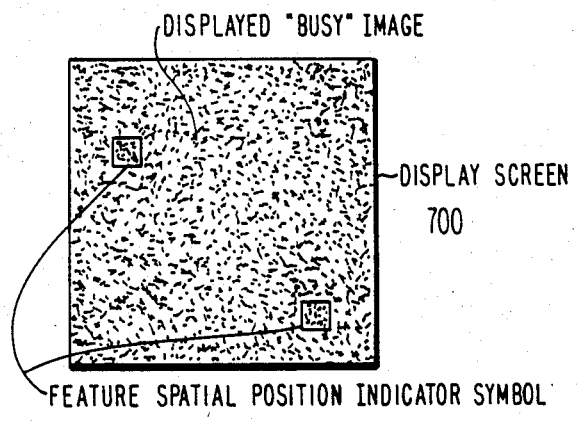
Figure 8A:
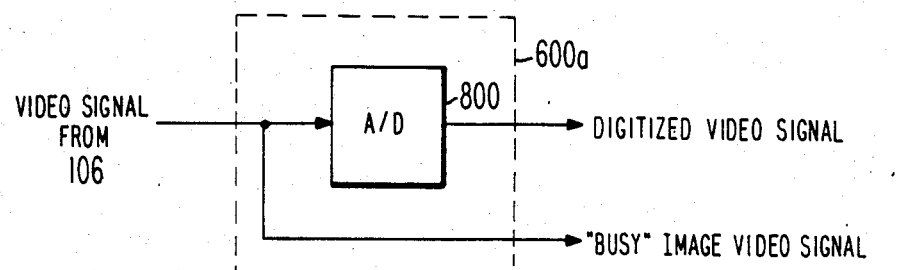
Figure 8B:
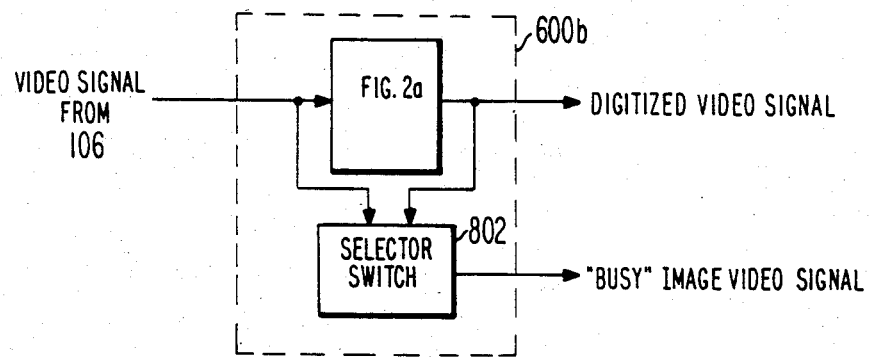
Figure 8C:
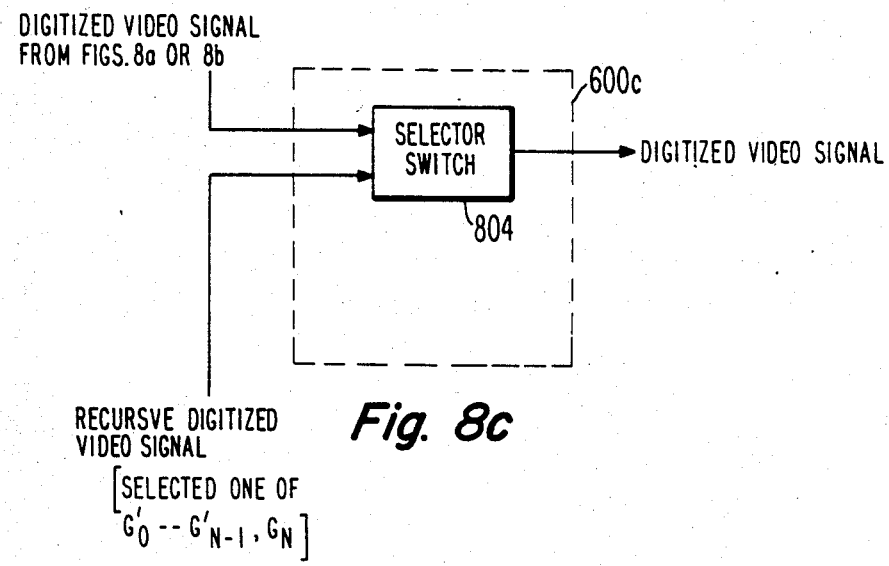
Figure 9A:
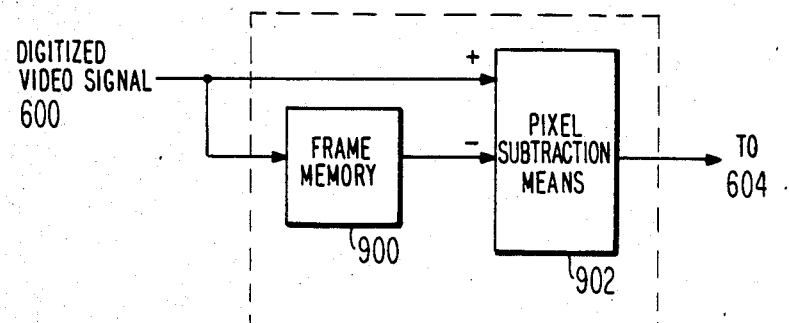
Figure 9B:
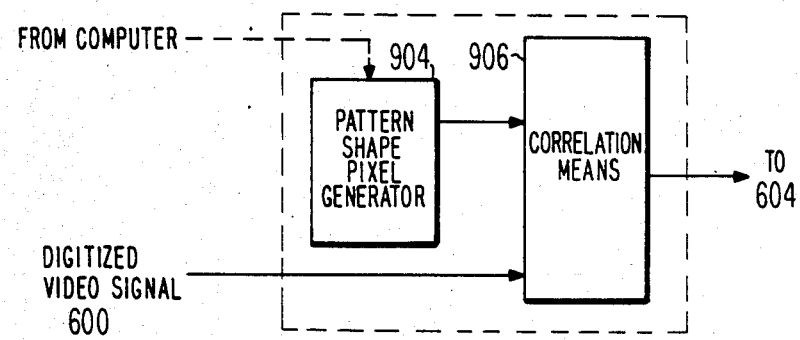
Figure 9C:
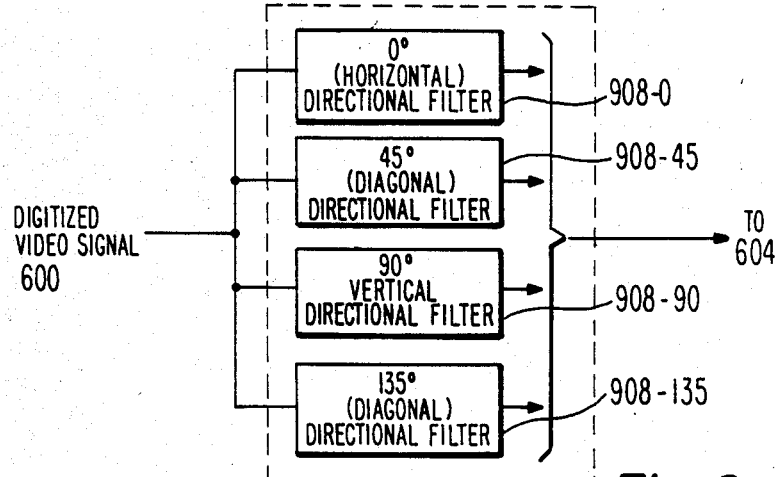

FIG. 6 is a functional block diagram of a third illustrative embodiment of the image-reduction means of FIG. 1;

FIG. 6a is a functional block diagram of a fourth illustrative embodiment of the image-reduction means of FIG. 1;

FIG. 7 diagramatically shows the type of visual display obtainable employing the third or fourth illustrative embodiment of FIGS. 6 or 6a;

FIGS. 8a, 8b and 8c show respective alternative examples of the VIDEO SIGNAL SOURCE of FIG. 6 for providing the digitized video signal to be processed thereby; and FIGS. 9a, 9b and 9c show respective alternative examples of the FEATURE OF INTEREST DETECTOR of FIG. 6.

Referring to FIG. 1, there is shown a system that includes as essential components a foveated automatic electronic camera 100 and a computer 102. The system of FIG. 1 may also include optional operator station 104. Camera 100 includes as essential components high-resolution, wide-field-of-view imager means 106 and image-data reduction means 108. Imager means 106 and data reduction means 108 may be integrated in a single housing of camera 100 (as shown in FIG. 1) or, alternatively, they may comprise separate modular components of camera 100.

Imager means 106 is comprised of a monochrome or color television camera for viewing objects situated within a relatively wide-field-of-view region of space and deriving therefrom a video signal which is applied as an input to data reduction means 108. This video signal represents in real time all the pixels of each of relatively high-resolution successive image frames derived by imager means 106. For instance, each two-dimensional image frame from imager means 106 may be comprised of 512×512 (262,144) pixels. The successive image frames may occur at a rate of 30 frames per second. In this case, a serial stream of pixels are applied to data reduction means 108 at a rate of nearly eight million pixels per second by the video signal output of imager means 106. However, in some cases it is desirable in a robotic system or in an automatic surveillance camera system to provide a resolution greater than 512×512 pixels per image frame and/or to provide a frame rate of more than thirty frames per second (thereby increasing the pixel rate of the video signal applied to data reduction means 108 beyond eight million pixels per second).

Image analysis by a computer normally requires that an image pixel be in digital (rather than analog) form. In order to provide a sufficiently high resolution gray scale, it is usual to digitize each of the image pixel levels at eight bits per pixel. Thus, in the absence of image data reduction, it would be necessary, in a real time environment, for the computer to process in real time 16 million bits per second or more. Very few image-analyzing computers can operate at this rate and those that do are very expensive.

Data reduction means 108, to which the present invention is primarily directed, greatly reduces the amount of data that must be handled by computer 102, without sacrificing either the high-resolution or wide field of view capability of imager means 106.

The reduced image data output from data reduction means 108 (which constitutes the output from the foveated automatic electronic camera 100) is applied as an input to computer 102. Computer 102 analyzes the reduced image data applied thereto in accordance with its programming. Its programming, of course, depends on the particular purpose of the system shown in FIG. 1. For instance, in the case of a surveillance system, computer 102 may be programmed to recognize significant changes in the scene being viewed by imager means 106, such as the presence of moving objects, objects having one or more particular shapes, etc. Computer 102 may include an output to some utilization means (not shown), such as an alarm in the case of a surveillance system. Another example of the system shown in FIG. 1 is a robotic system. In this case, computer 102 is programmed to provide a desired "eye-hand" coordination between a mechanical-hand utilization means and imager means 106. More specifically, computer 102 applies certain command signals as an output to a mechanical hand in accordance with both information contained in the reduced data applied thereto from imager means 106 and in feedback signals received from the mechanical hand utilization means.

Imager means 106 of camera 100 (depending on its use) may be either stationary or movable. For instance, in the case of a robotic system, it would usually be desirable to provide moving means 110 for imager means that is controlled by an output from computer 102 in accordance with object information contained in the reduced image data input applied thereto regarding the region of space then within the field of view of imager means 106. In this case, moving means 110 returns feedback signals to computer 102 for indicating the actual position of imager means 106.

As so far discussed, the combination of camera 100 and computer 102 provides a totally automated system (that is no human operator is required). However, if desired, the system of FIG. 1 may include optional operator station 104. As indicated in FIG. 1, station 104 is comprised of display 112 and manual control 114. Display 112 permits the operator to view image information derived by computer 102 and manual control 114 permits the operator to transmit manual command signals to computer 102. By way of example, the purpose of these manual command signals may be selecting the image information to be displayed on display 112, and/or manually controlling the respective outputs from computer 102 to any or all of data reduction means 108, moving means 110 or the utilization means (not shown).

Figure 3:
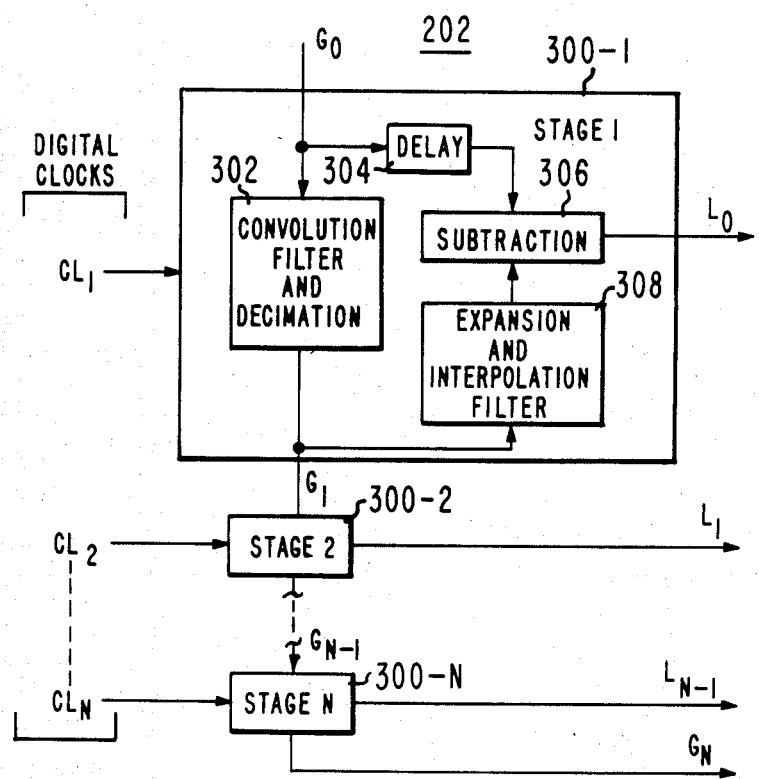
FIG. 3 is a functional block diagram of a first preferred embodiment of the spatial frequency spectrum analyzer of FIG. 2.
Figure 3A:
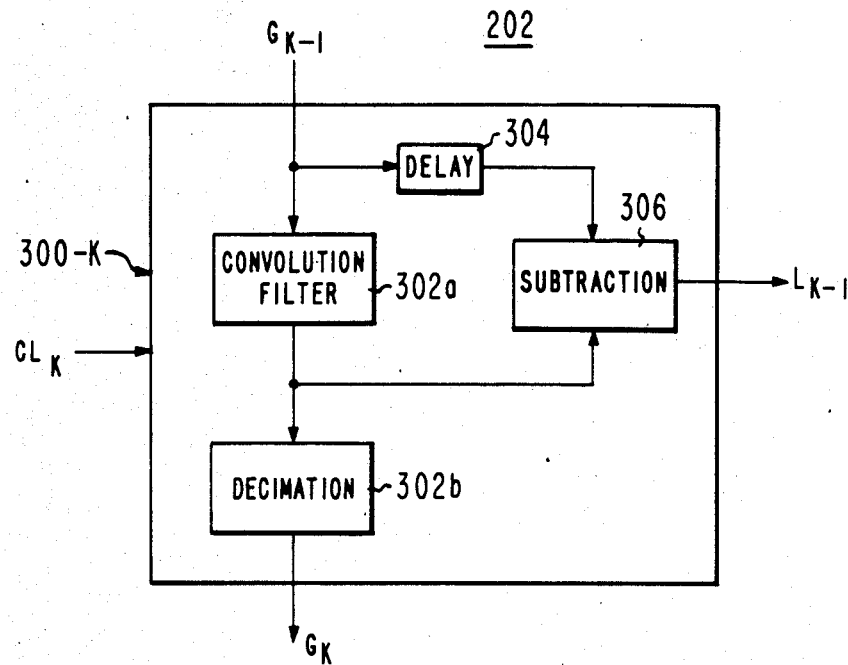
FIG. 3a is a functional block diagram of a second preferred embodiment of the spatial frequency spectrum analyzer of FIG. 2.

Referring to FIG. 2, there is shown a first embodiment of data reduction means 108 which incorporates the principles of the present invention. A video signal input to data reduction means 108 from imager means 106 (which may be a sampled signal from a solid state imager such as a CCD imager or, alternatively, a continuous signal from a television-tube imager) is applied to an analog-to-digital (A/D) converter 200, which converts the level of each successively-occurring pixel of the video signal into a multibit (e.g., eight-bit) digital number. Each successive two-dimensional image frame represented by the video signal is comprised of $P_X$ pixels in the horizontal direction and $P_Y$ pixels in the vertical direction. Because imager means 106 is a high resolution imager, the value of each of $P_X$ and $P_Y$ is relatively large (e.g., 512). The video signal itself is a temporal signal derived by scanning, during each frame period, the two-dimensional spatial image then being viewed by the imager of imager means 106. The digital output from A/D 200 is applied as an input to spatial frequency spectrum analyzer 202. Alternative embodiments of spectrum analyzer 202 are shown in FIGS. 3 and 3a, discussed in some detail below.

Spatial frequency spectrum analyzer 202, in response to the digitized video signal representing each successive imager frame applied as an input thereto, derives an ordinally-arranged set of N+1 (where N is a plural integer) separate video output signals $L_0 \ldots L_{N-1}$ and $G_N$. The respective video output signals $L_0 \ldots L_{N-1}$ and $G_N$ comprise contiguous subspectra bands of the spatial frequency spectrum of the image defined by the pixels of each successive image frame of the digitized input video signal to analyzer 202. Each of video output signals $L_0 \ldots L_{N-1}$ defines a bandpass band of the spatial frequency spectrum of the image, with $L_0$ defining the highest spatial frequency bandpass band and $L_{N-1}$ defining the lowest spatial frequency bandpass band of the image spectrum. $G_N$ defines a low-pass remnant band that includes all spatial frequencies of the spatial frequency spectrum of the image which are below those of the $L_{N-1}$ bandpass band. Preferably, each of the respective bandpass bands $L_0 \ldots L_{N-1}$ has a bandwidth corresponding to each of the two spatial dimensions of the image of one octave (i.e., if the highest spatial frequency to be analyzed by spectrum analyzer 202 in any dimension is $f_0$, the $L_0$ bandpass band in that dimension has a center frequency of $3f_0/4$, the $L_1$ bandpass band in that dimension has a center frequency of $3f_0/8$, the $L_2$ bandpass band in that dimension has a center frequency of $3f_0/16$, etc.). Thus, the first band $L_0$ of the group of output video signals exhibits the same relatively high spatial resolution as does the input video signal to spectrum analyzer 202. Further, this first band $L_0$ of the group is comprised of the same number $(P_X \cdot P_Y)$ of pixels per frame as is the input video signal to analyzer 200. However, each of the other bands of the group exhibits a lower spatial resolution and a smaller number of pixels than its immediately preceding band of the group. Thus, the last band $G_N$ (the remnant band) of the group is comprised of a second given number of pixels ($P'_X \cdot P'_Y$) which is the lowest number of pixels in any of the bands of the group.

In FIG. 2, each of the bandpass bands of $L_0 \ldots L_{N-1}$ is applied as a signal input to a corresponding one of $P'_X \cdot P'_Y$ window gates 204-0 ... 204-(N−1). Each of gates 204-0 ... 204-(N−1) also has an individual window center control signal from computer 102 applied as a control input thereto, as indicated in FIG. 2. Each of the respective gates 204-0 ... 204-(N−1) permits a localized two-dimensional spatial portion comprised of $P'_X \cdot P'_Y$ pixels of each frame to be passed therethrough as the respective output $L'_0 \ldots L'_{N-1}$ of that gate. Each gate, therefore, operates as a spatial window for this passed-through localized two-dimensional spatial portion. The window center control signal applied to each of gates 204-0 ... 204-(N−1) determines the relative position of this localized spatial portion of each frame. In FIG. 2, the respective outputs $L'_0 \ldots L'_{N-1}$ from gates 204-0 ... 204-(N−1) along with the $G_N$ output from analyzer 202, are applied to computer 102 either directly or, alternatively, through a multiplexer or other data communication means (not shown).

Figure 2A:
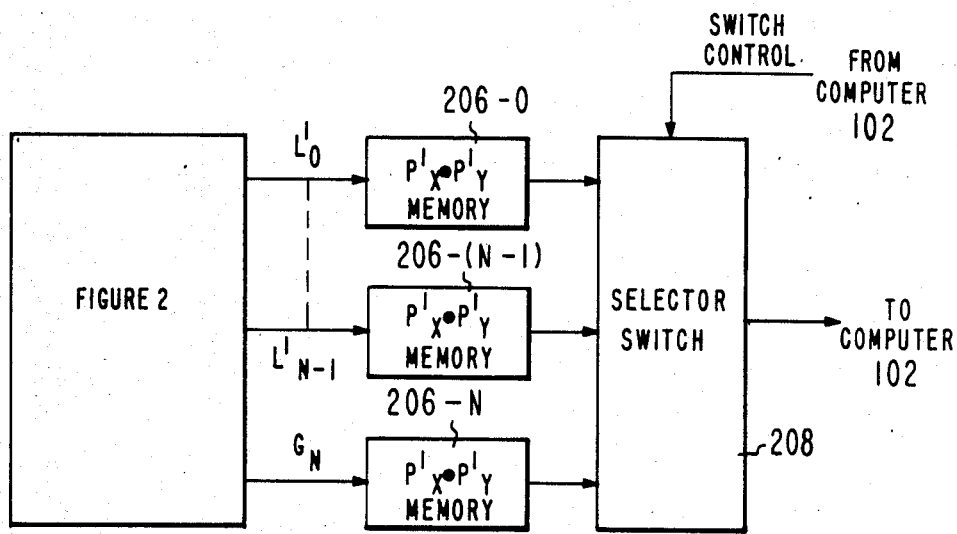
FIG. 2a is a functional block diagram of a second illustrative embodiment of the image-reduction means of FIG. 1.

The FIG. 2 implementation of image data reduction means 108 of camera 100 incorporates the relatively least structure required to provide computer 102 image data that has been reduced in accordance with the principles of the present invention. In this case computer 102 includes suitable memory means for storing, at least temporarily, the reduced image data applied from image data reduction means 108 and selection means for deriving this stored reduced image data control signals returned to data reduction means 108. However, in some cases, it is desirable to incorporate such memory means and selection means as part of data reduction means 108 of camera 100, rather than incorporating these means in computer 102. FIG. 2a illustrates this alternative embodiment of image data reduction means 108.

As indicated in FIG. 2a, the respective outputs $L'_0 \ldots L'_{N-1}$ and $G'_N$ from the embodiment of FIG. 2 are not forwarded out of camera 100 to computer 102. Instead, the alternative embodiment of data reduction means 108 shown in FIG. 2a further includes a group of memories 206-0 ... 206-N each of which is individually associated with a corresponding one of respective outputs $L'_0 \ldots L'_{N-1}$ and $G_N$. During each successive frame, the $P'_X \cdot P'_Y$ pixels of each of the $L'_0 \ldots L'_{N-1}$ and $G_N$ outputs (FIG. 2) are written into its corresponding one of $P'_X$ and $P'_Y$ memories 206-0 ... 206-N. After a time delay provided by each of memories 206-0 ... 206-N, each of these memories is read out and the output signal therefrom is applied as a separte input to selector switch 208. Selector switch 208, in response to a switch control applied thereto from computer 102, selectively forwards the $P'_X \cdot P'_Y$ stored pixels read out from any single one of the group of memories 206-0 ... 206-N as an output from data reduction means 108 of camera 100 to computer 102.

Spatial frequency spectrum analyzer 202 of FIG. 2 can be simply comprised of a plurality of bandpass filters, each of which derives as an output respective ones of bandpass signals $L_0 \ldots L_{N-1}$ and a lowpass filter for deriving the remnant signal $G_N$. In some cases, low pass filters may be substituted for one or more of the bandpass filters. However, it is preferred that analyzer 202 be structurally embodied in the manner shown either in FIG. 3 or, alternatively, in FIG. 3a. In this regard, reference is made to U.S. Pat. No. 4,674,125 issued June 16, 1987 to C. R. Carlson, J. H. Arbeiter and R. F. Bessler. This patent, entitled "Real-Time Hierarchal Pyramid Signal Processing Apparatus" and assigned to RCA Corporation, discloses in detail each of the alternative embodiments of the spatial frequency spectrum analyzer 202 shown in FIGS. 3 and 3a.

More particularly, the embodiment shown in FIG. 3 is capable of implementing in real time a hierarchical pyramid signal processing algorithm developed by Dr. Peter J. Burt (and, therefore, is referred to as the "Burt Pyramid"). The embodiment shown in FIG. 3a is another type of real-time hierarchical pyramid signal processor, known as the "FSD (filter-subtract-decimate) Pyramid."

As indicated in FIG. 3, the Burt Pyramid analyzer is comprised of a pipeline of generally similar sampled-signal translation stages 300-1, 300-2 ... 300-N. Each of the respective stages operates at a sample rate determined by the frequency of the digital clock signals $CL_1$, $CL_2$. .. $CL_N$ individually applied thereto. The frequency of the clock signal applied to any particular one of the stages is lower than the frequency of the clock applied to any stage that precedes it. Preferably, the frequency of each of the clocks of stages 300-2 ... 300-N is one-half of the clock of the immediately preceding stage. In the following description it will be assumed that this preferable relationship among the clocks signals $CL_1$ .. . $CL_N$ is the case.

As indicated in FIG. 3, stage 300-1 is comprised of convolution filter and decimation means 302, delay means 304, subtraction means 306 and expansion and interpolation filter means 308. An input stream of digitized pixels $G_0$, having a sample rate equal to the frequency of clock $CL_1$ is applied through convolution filter and decimation means 302 to derive an output stream of pixels $G_1$ at a sample rate equal to the frequency of clock $CL_2$. $G_0$ is the digitized video signal input to analyzer 202. The convolution filter has a low pass function that reduces the center frequency of each image dimension represented by $G_1$ to one-half of the center-frequency of the corresponding dimension represented by $G_0$. At the same time, the decimation reduces the sample density in each dimension by one-half.

The respective pixels of $G_0$ are applied through delay means 304 as a first input to subtraction means 306. At the same time, the reduced-density pixels of $G_1$ are applied to expansion and interpolation filter 308, which increases the sample density of the $G_1$ pixels back to that of $G_0$. Then, the expanded density interpolated $G_1$ pixels are applied as a second input to subtraction means 306. The presence of delay means 304 ensures that each pair of samples $G_0$ and $G_1$, which correspond with one another in spatial position, are applied to the first and second inputs of subtraction means 306 in time coincidence with one another. The output stream of successive samples $L_0$ from substraction means 306 defines the highest spatial frequency in each dimension of the scanned image.

The structure of each of stages 300-2 ... 300-N is essentially the same as that of stage 300-1. However, each of the higher ordinal numbered stages 300-2 ... 300-N operates on lower spatial frequency signals occurring at lower sample densities than its immediately preceding stage. More specifically, the output stream of successive samples $L_1$ represents the next-to-highest octave of spatial frequencies in each image dimension, etc., so that, as indicated in FIG. 3, the Burt Pyramid analyzed signal is comprised of respective octave sample stream $L_0 \ldots L_{N-1}$ (derived respectively from the subtraction means of each of stages 300-1 ... 300-N) together with a low-frequency remnant signal $G_N$ (derived from the output of the convolution filter and decimation means of stage 300-N).

A primary advantage of the Burt Pyramid, discussed in more detail in the aforesaid co-pending Carlson, et al. application), is that it permits a reconstituted image synthesized from the respective analyzed outputs $L_0 \ldots L_{N-1}$ and $G_N$ to be derived in a manner such that the introduction of noticeable artifacts into the image processing due to image processing are minimized. A disadvantage of a Burt Pyramid is that it requires an expansion and interpolation filter (in addition to a convolution filter and decimation) per analyzer stage, and this increases both its cost and complexity.

The FSD pyramid analyzer, shown in FIG. 3a, is similar to the Burt Pyramid analyzer in several ways. First, the FSD analyzer is also comprised of a pipeline of generally similar sampled-signal translation means 300-1, 300-2 ... 300-N. Second, each of the respective stages operates at a sample rate determined by the frequency of the digital clock signals $CL_1, CL_2 \ldots CL_N$ individually applied thereto. Third, the frequency of the clock signal applied to any particular one of the stages is preferably one-half that of the clock of the immediately preceding stage.

However, the specific structural arrangement comprising each of the stages of the FSD pyramid analyzer differs somewhat from the structural arrangement comprising each stage (such as stage 300-1 of FIG. 3) of the Burt Pyramid analyzer. More specifically, each stage 300-K (where K has any value between 1 and N) of the FSD pyramid analyzer shown in FIG. 3a is comprised of convolution filter 302a, decimation means 302b, delay means 304 and subtraction means 306.

The output from convolution filter 302a, (before decimation by decimation means 302b) is applied as an input to subtraction means 306. This structural configuration eliminates the need for providing an expansion and interpolation filter in each stage of an FSD pyramid analyzer. The elimination of expansion and interpolation filters significantly reduces both the cost and the amount of inherent delay of each stage of the FSD pyramid analyzer shown in FIG. 3a, compared to that of each stage of the Burt Pyramid analyzer shown in FIG. 3.

For the purpose of explaining the operation of the system shown in FIGS. 1 and 2 (or, alternatively, FIGS. 1 and 2a), reference is now made to FIGS. 4 and 5.

The rectangle 400 represents the relatively large size of the two-dimensional spatial region defined by an entire image frame of pixel samples. The $G_N$ output from analyzer 202 (which is applied to computer 102 without passing through a window gate) represents this entire image-frame spatial region with the low-resolution definition provided by only $P'_X \cdot P'_Y$ pixels per frame. Thus, as shown in FIG. 5, this $G_N$ signal represents a low-resolution global-view image 500 of one or more objects (such as vase 502) within the region of space then being viewed by camera 100. For illustrative purposes, the respective values of both $P'_X$ and $P'_Y$ in FIGS. 4 and 5 is assumed to be 6. Thus, the entire area of the global-view low resolution spatial image region 400 (shown in FIGS. 4 and 5) is comprised of only 36 pixels.

The $L'_{N-1}$ output from window gate 204-(N−1) represents the localized spatial subregion 402. Subregion 402, which has both horizontal and vertical dimensions only one-half of that of spatial region 400, is only one-fourth the area of region 400. However, as indicated in FIG. 5, subregion 402 is also comprised of 36 pixels, thereby providing a higher-resolution intermediate view 504 of vase 502 than that provided by low-resolution global-view 500.

In a similar manner, each of localized spatial subregions 404 and 406—represented respectively by the $L'_{N-2}$ and $L'_{N-3}$ outputs from respective window gates 204-(N−2) and 204-(N−3), neither of which is shown in FIG. 2—are also each comprised of 36 pixels (as shown in FIG. 5). However, the area represented by spatial subregion 404 is only one-quarter of that of spatial subregion 402 (or one-sixteenth of that of global view subregion 400). Therefore, the resolution of intermediate view 506 of vase 502 is higher than that of intermediate view 504 (which, in turn, is higher than that of low-resolution global-view 500). Similarly, the area of spatial subregion 406 is only one quarter of that of spatial subregion 404 (or 1/64th of that of global-view spatial region 400). Thus, the resolution view 508 of vase 502 is exhibited with the highest resolution.

For illustrative purposes, in describing in the operation of the present invention, the value of N has been assumed to be only 3. Therefore, in this case, $L'_0$ represents spatial subregion 406, with spatial subregions 404, 402 and 400 being respectively represented by $L_1$, $L'_2$ ($L'_{N-1}$) and $G_3$ ($G_N$). In practice, N would have a value greater than 3 (normally at least 5 or 6). Further, in practice, the respective values of $P_X$ and $P_Y$ would be greater than 6 (such as 32 or 16, for example). In such cases, the spatial image region represented by the high-resolution, wide field-of-view video signal from imager means 106, defined by 512·512 pixels (or even 1024·1024 pixels) is reduced by data reduction means 108 to five or six separate various resolution views of either 16·16 or 32·32 pixels each.

As indicated in FIG. 2, computer 102 provides an individual window center control signal to each of window gates 204-0 ... 04-(N−1). This permits each of the respective spatial subregions (e.g. spatial subregions 402, 404 and 406) to be moved in accordance with command signals from computer 102. For instance, as schematically indicated by the arrow in FIG. 4, each of the respective spatial subregions 402, 404 and 406 can be independently and selectively moved from its preceding location (shown in phantom lines) within spatial region 400 to its current location (shown in solid lines) within region 400. In this manner, any part of the global view of the spatial region 400 can be shown in any one of the various higher resolutions.

In the case of a surveillance camera, computer 102 can first analyze the low resolution global view spatial region to determine whether or not it appears that any object of interest (such as a moving object, an object having a particular shape, etc.) is present in any subregion of this global view. If so the computer can then examine this subregion at higher and higher resolutions for the purpose of confirming whether or not an object of interest is actually present. A somewhat similar examination by computer 102 would be useful in a robotic system to provide "eye-hand" coordination.

The important advantage of the present invention is that the amount of data that must be handled by the computer is greatly reduced, without, at the same time, reducing either the resolution or field of view capability of the imager means.

In the case of FIG. 2a, computer 102 provides a switch control for selector switch 206 that permits computer 102 to selectively examine at any one time only the data stored in any one of $P'_x \cdot P'_y$ memories 204-0 . . . 204-N. This further reduces the amount of data that must be handled by computer 102.

It is plain that it may be desirable in certain cases to pass even the last band of the group of bands through a movable window which forwards even fewer than said second given number of pixels to the output of image data reduction means 108. Further, in the case in which imager means 106 is provided with moving means 110, it is possible to maintain the respective windows in predetermined fixed spatial relationships relative to one another and move imager means under the control of the computer to bring the object of interest into the highest resolution window. It also may be desirable to substitute a selector switch for selector switch 208 that is capable of selecting any two or more outputs of memories 204-0 to 204-N at the same time and then simultaneously displaying the selected memory outputs on display 112. Such structural modifications are contemplated by the present invention.

The amount of image data that must be supplied to computer 102 (FIG. 1) by image data reduction means 108 (FIG. 1) can be further reduced by employing an embodiment of image data reduction means 108 which detects and preliminary processes one or more "features of interest." Such features of interest, without limitation, may include the spatial position of (1) moving objects (as opposed to stationary objects), (2) specified pattern shape or shapes, and/or (3) objects having particular spatial orientations in the wide-field-of-view image represented by the video signal input to image data reduction means 108 from imager means 106. Other likely features that might be of interest would include specified spatially local color and/or image texture. The block diagram of FIG. 6 illustrates an embodiment of image data reduction means 108 having such a capability.

Referring to FIG. 6, image data reduction means 108 is comprised of video signal source 600, feature of interest detector 602, pixel absolute value transferfunction means 604, convolution filter/decimator pyramid 606, and the group of $P'_x \cdot P'_y$ window gates 608-0 . . . 608-(N−1).

Video signal source 600 may take any one of various forms, examples of which are shown in FIGS. 8a, 8b and 8c. In any event, video signal source 600 derives a digitized video signal having a relatively large number ($P_x \cdot P_y$) pixels per frame. In its simplest form (FIG. 8a), video signal source 600a is comprised solely of an analog-to-digital converter 800, which is effective in digitizing the analog video signal from high resolution, wide-field-of-view imager means 106 (FIG. 1). As is further indicated in FIG. 8a, the analog video signal from imager means 106 may be employed in FIG. 6 as a "busy" image video signal. For the purposes of describing the operation of the embodiment of data reduction means 108 shown in FIG. 6, it first will be assumed that video signal source 600 is comprised of the simple form shown in FIG. 8a. Thereafter, the more complex forms of video signal source 600 (600b and 600c) shown in FIGS. 8b and 8c will be discussed.

The digitized video signal from video signal source 600 is applied as an input to feature of interest detector 602. Depending on the feature or features of interest, detector 602 also may take various forms. For illustrative purposes, three examples of different forms of feature of interest detector 602 are shown in FIGS. 9a, 9b and 9c. For purposes of describing the operation of the embodiment of image data reduction means 108 shown in FIG. 6, it first will be assumed that feature of interest detector 602 has the form (602a) shown in FIG. 9a. Thereafter, the feature of interest detectors (602b and 602c) shown in FIGS. 9b and 9c will be described.

Referring for the moment to FIG. 9a, there is shown for illustrative pusposes a simple and unsophisticated form of moving-object feature detector 602a, which is comprised of frame memory 900 and pixel subtraction means 902. The digitized video signal output of video signal source 600 is applied as an input to both frame memory 900 and the plus (+) input terminal of pixel subtraction means 902, and the output from frame memory 900 is applied to the minus (−) terminal of pixel subtraction means 902. Frame memory 900 is effective in storing one complete frame of pixels and, after exactly a one-frame delay, applying each read-out pixel of the stored frame to the minus terminal of pixel subtraction means 902 in isochronous time relationship with the application of the corresponding pixel of the current digitized-video-signal frame to the plus terminal of pixel subtraction means 902. Pixel subtraction means 902 derives an output video signal therefrom in which the polarity and level value of each pixel thereof is in accordance with the algebraic difference in levels of each pair of corresponding pixels applied respectively to the plus and minus input terminals of pixel subtraction means 902. Therefore, except for any noise background, any pixels of the digitized video signal from source 600 which correspond in spatial position to stationary objects in the image represented by this digitized video signal result in substantially zero-level corresponding pixels being derived in the output video signal obtained from pixel subtraction means 902. However, moving objects in the image represented by the digitized video signal from source 600 (i.e., objects that change in relative spatial position within this represented image between successive frames of the digitized video signal from source 600) result in the output video signal derived from pixel subtraction means 902 being comprised of both positive and negative pixels having levels significantly above and below zero. Furthermore, the relative spatial position of the moving object in the image represented by the pixel subtraction means output video signal is defined by the relative temporal position of the aforesaid positive and negative pixels in such output video signal, while the relative speed of the moving object is related to the amount of separation between corresponding positive and negative pixels of the output video signal from pixel subtraction means 902.

In practice, more complex and sophisticated forms of moving-object feature detectors may be employed. By way of examples, such sophisticated forms may include (1) a frame memory that provides a selectable integral number of frame delays between its input and output (to permit slowly moving objects to be distinguished from fast moving objects); (2) temporal filters; and/or (3) spatial-temporal filters.

Based on the foregoing discussion, it is plain that the image represented by the digitized video signal from source 600 is much "busier" than the derived movingobject image, represented in the illustrative embodiment of FIG. 9a by the output video signal from pixel subtraction means 902. Put another way, pixel subtraction means 902 substantially reduces the amount of data present in the "busy" image digitized video signal from source 600 and substantially eliminates all of the large amount of data which relates to stationary objects in the digitized-video-signal image from being represented inthe output video signal from pixel subtractions means 902.

The output video signal derived by feature of interest detector 602 is applied as an input to pixel absolute value transfer-function means 604. The level of each pixel of the video signal applied as an input to pixel absolute value means 604 from feature of interest detector 602 may or may not have both a polarity (positive or negative) in addition to a level value. Pixel absolute value transfer-function means 604 operates on each pixel of the video signal input thereto in accordance with its predetermined transfer function. At the very least, this transfer function removes any pixel polarity information that may be present and provides a video signal output therefrom in which each pixel thereof is defined by only as absolute level value. In the simplest case, this absolute value is proportional to the level value (but not the polarity) of the corresponding pixel applied to the input of pixel absolute value transfer-function means 604. In this simplest case, should each pixel of the video signal input to pixel absolute value transfer-function means 604 be represented by a binary number in which the most significant bit provides polarity information, and the remaining bits provide level-value information, means 604 may operate to provide pixel absolute value by merely dropping this most significant bit. In this case, the transfer function of the absolute level value of pixel is unity.

Alternatively, means 604 may utilize more complex transfer-function operations to derive pixel absolute values, for its output video signal. For instance, the transfer function operation may compute a square function of the level value of each pixel of the input video signal thereto. Pixel absolute value transfer-function means 604 may include signal-processing means (which may be adaptive) in the form of a look-up table, amplifier, selector, compressor, etc. for providing some certain transfer-function operation on pixels of the video signal input thereto. Such signal-processing means may or may not be responsive to the polarity of the respective pixels comprising the input video signal to means 604. By way of examples, means 604 may include a level-threshold means for providing zero-value levels for all pixels in the output video signal therefrom which correspond to pixels of the input video signal thereto that have an absolute level value below a predetermined minimum, and/or a quantizer for compressing the number of gray-scale level values of the significant pixels from feature-of-interest detector 602 (thereby further reducing the amount of image data).

As indicated in FIG. 6, each of the respective video signal outputs from feature of interest detector 602 and pixel absolute value means 604 retain $P_x \cdot P_y$ pixels per frame.

It is conceivable that the pixels of the feature of interest to be detected in a given case can only be comprised of pixels having only absolute level values (i.e., all pixels necessarily having the same polarity). In this exceptional case, the feature-of-interest detector might inherently perform the function of the pixel absolute value transfer-function means, as well. Nevertheless, in order to remain general, it should be understood that the separate recitation in the claims of the feature-of-interest detection and pixel absolute value transfer-function functions is intended to also cover the aforesaid exceptional case.

The output video signal from pixel absolute value means 604 is applied as an input to convolution filter/decimator pyramid 606. Convolution filter/decimator pyramid 606 is generally similar to the prior art pyramid shown in FIG. 3, but differs therefrom to the extent that each stage thereof omits the subtractions means, the expansion and interpolation filter, and possibly the delay means of the FIG. 3 prior art. Thus, each stage of convolution filter/decimator pyramid 606 is comprised of a low-pass convolution filter and decimation means and possibly a delay means. The $G_0$ output from convolution filter/decimator pyramid 606 is comprised of the unfiltered, undecimated input video signal applied thereto (with or without delay, as the case may be). The $G_1 \ldots G_{N-1}$, $G_N$ outputs from convolution filter/decimator pyramid 606 represent, respectively, the outputs from the convolution filter and decimation means (with or without delay, as the case may be) of the first $\ldots (N-1)$th and Nth respective stages of pyramid 606.

Because the output video signal from pixel absolute value means 604 applied as an input to convolution filter/decimator pyramid 606 is comprised solely of absolute-value pixels (that is all pixels have the same polarity), the baseband of this input video signal to pyramid 606 necessarily is comprised of DC and low-frequency components (as well as high-frequency components). The convolution filter of each successive stage in pyramid 606 is a low-pass filter having a nominal upper cutoff frequency lower than the nominal upper cutoff frequency of its immediately preceding stage of pyramid 606. Further, the decimation that occurs in each stage in pyramid 606 reduces the number of pixels (pixel density) below the pixel density of its immediately preceding stage of pyramid 606. Therefore, the $G_0$ input from pyramid 606 will have the highest pixel density ($P_x \cdot P_y$ pixels per frame); the $G_N$ output from pyramid 606 will have the lowest pixel density ($P'_x \cdot P'_y$ pixels per frame); and each of the outputs $G_1 \ldots G_{N-1}$ from pyramid 606 will have a pixel density below its immediately preceding G output and above its immediately succeeding G output from pyramid 606.

From the point of view of the respective images represented by the $G_0 \ldots G_N$ outputs from pyramid 606, each pixel of respective outputs to $G_1 \ldots G_N$ represents a larger localized spatial sub-region area of the image than does a pixel of its immediately preceding output from pyramid 606. Furthermore, in the case of outputs $G_1 \ldots G_N$ of pyramid 606, the level value of a pixel corresponding to a certain spatial sub-region area of the image represents the integration (sum or average) of the level values of all the respective pixels of its immediately preceding output from pyramid 606 which occupy this certain spatial sub-region area of the image.

One result of such integration is to undesirably increase the dynamic range of pixel level values. In particular, a single significant level value $G_0$ pixel surrounded by zero-level value $G_0$ pixels will integrate to a quite low level value $G_N$ pixel, while a spatially localized cluster of significant level value $G_0$ pixels will integrate to a quite high level value $G_N$ pixel. This undesirable increase in dynamic range is exacerbated if the single $G_0$ pixel has a significant level value just above threshold and the cluster of $G_0$ pixels have significant level values much higher than threshold. In order to compress this undesirable increase in dynamic range it is usually necessary to multiply the level value of each integrated pixel by a factor of two to four and then limit the multiplied level value to a predetermined maximum level value.

Respective outputs $G_0 \ldots G_{N-1}$ from pyramid 606 are applied as respective inputs to movable $P'_x \cdot P'_y$ window gates 608-0 ... 608-(N−1). Window gates 608-0 ... 608-(N−1), which correspond in structure and function to window gates 204-0 ... 204-(N−1) of FIG. 2, are moved in accordance with window center control signals from the computer. Thus, the respective outputs $G'_0 \ldots G'_{N-1}$ from window gates 608-0 ... 608-(N−1) represent localized sub-region areas of the image, each of which is comprised of $P'_x \cdot P'_y$ pixels of its corresponding output from pyramid 606. Since $G_0$ represents a higher-resolution (a greater number of pixels) image than the image represented by the $G_1$ output from pyramid 606, the size of the spatial sub-region area of the image represented by the $P'_x \cdot P'_y$ pixel $G'_0$ window is smaller than the size of the spatial sub-region area of the image represented by the $P'_x \cdot P'_y$ pixel $G'_0$ window. In a similar manner, the size of the spatial sub-region of the image represented by each $P'_x \cdot P'_y$ pixel succeeding $G'$ window is larger than that of its immediately preceding $G'$ window. However, as indicated in FIG. 6, the $G_N$ output from pyramid 606 is comprised of only $P'_x \cdot P'_y$ pixels per frame. Thus, the entire spatial region area of the image is represented by the $P'_x \cdot P'_y$ pixels of the $G_N$ signal.

The $G'_0 \ldots G'_{N-1}$ and $G_N$ output video signals are all supplied to computer 102. Therefore, computer 102 can be programmed to (1) locate the respective spatial positions of only those particular ones of the $P'_x \cdot P'_y$ pixels of the $G_N$ video output signal that exhibit significant absolute value levels, and (2) then use this information to successively move the respective window gates 608-(N−1) ... 608-0, in turn, to localize with greater and greater resolution the image data contained in each of these smaller and smaller spatial sub-region areas of the image defined by each of the aforesaid particular $G_N$ pixels that exhibit significant absolute value levels. Further, the fact that the $G'_0 \ldots G'_{N-1}$ and $G_N$ output video signals supplied to computer 102 are comprised substantially solely of the relatively small amount of "interesting" image data (substantially all of the "uninteresting" image data in the original video signal from source 600 having been removed) makes the programming of computer 102 simpler and its effective speed of operation faster.

Besides being programmed to control the movement of the spatial window gates, computer 102 also may be programmed to provide further fine-detail and/or complex analysis of the reduced image data supplied thereto by the $G'_0 \ldots G'_{N-1}$ and $G_N$ output video signals. Such analysis may be based on the spatial frequency content of the particular image data supplied thereto, for instance.

Consider the assumed case in which video signal source 600 is implemented in accordance with FIG. 8a and feature of interest detector 602 is implemented in accordance with FIG. 9a. Assume further that the embodiment of image data reduction means 108 shown in FIG. 6 forms part of a surveillance camera system, in which it is desired to visually identify the relative spatial location of moving objects within the area of a spatial region being viewed by a television camera that provides a "busy" image video signal containing both moving and stationary objects within this spatial region. In this case, the "busy" image video signal from video signal source 600 is applied through mixer 610 as an input to display 112 (FIG. 1).

However, after processing, the image video signal derived at the output of pixel absolute value means 604 is no longer "busy." Only a relatively few of the $P_x \cdot P_y$ pixels per frame of this derived video signal (that define a moving object) exhibit absolute value levels that are significant. All the remaining pixels per frame have substantially zero-valued levels. Employing the principles of the present invention, described above, computer 102 (starting with lowest image resolution spatial position data provided by the $G_N$ video output from pyramid 606) is able to control the centering of each of window gates 608-(N−1) ... 608-0, in turn, to thereby locate with high resolution the spatial position of any object within the area of the wide-field-of-view image. Computer 102 can then be programmed to use this high-resolution spatial-position information to generate one or more feature spatial position indicator symbol video signals (e.g., representing, when displayed, a small square, circle and/or other small predetermined shape symbol) which indicator symbol video signal is combined with the "busy" image video signal in mixer 610 and applied as a composite video signal input to display 112.

As indicated in FIG. 7, display screen 700 display 112 includes the display of one or more feature spatial position indicator symbols superimposed on these display "busy" image. In the case of the surveillance-camera example being discussed, the location of each feature spatial position indicator symbol on display screen 700 indicates the particular spatial position of a moving object within the spatial region being viewed by the surveillance camera. Computer 102 may also be programmed to ignore moving objects that are moving below a minimum speed (e.g., falling leaves, tree limbs moving in the breeze, etc.) to avoid false alarms. Also, computer 102 may be programmed to sound an audible alarm when a valid moving object is detected, thereby prompting the operator to examine display screen 700 and note the whereabouts of any feature spatial position indicator symbol thereon.

Other examples of feature of interest detector 602 are pattern-shape feature detector 602b (FIG. 9b) and oriented-direction feature detector 602c (FIG. 9c). As indicated in FIG. 9b, pattern-shape feature detector 602b includes a pattern-shape pixel generator 904 that generates a localized set of pixels that define a predetermined pattern shape. The generator may be capable of generating only a single predetermined shape or any selectable one of a plurality of predetermined shapes. Further, the size and/or orientation of any predetermined shape may be controllable. The selection and control (if any) may be manual control and/or computer control. In any event, the output from pattern shape pixel generator 904 is applied as a first input to correlation means 906 and the digitized video signal from source 600 is applied as a second input to correlation means 906. Correlation means 906 derives an output video signal therefrom in which all features of the image represented by digitized video signal 600 are removed except those features having the predetermined shape generated by generator 904.

The oriented-direction feature detector 602c of FIG. 9c includes one or more directional filters that are capable of detecting those edges in the image represented by the digitized video signal from source 600 which lie in (or at least close to) that direction. By way of example, FIG. 9c shows four separate directional filters 908-0, 908-45, 908-90, 908-135, which may be used to analyze the image represented by the input video signal thereto to determine the presence of object-edges therein that have one or more specified spatial orientations.

Feature of interest detector 602 may take other forms than those specifically shown in FIGS. 9a, 9b and 9c. Furthermore, the detected feature may have to meet more than one criterion. Thus, one could employ a feature of interest detector which detects only moving objects having a predetermined pattern shape that is oriented in a particular direction. From the point of view of the present invention, all that is important is that feature of interest detector 602 removes substantially all of the "uninteresting" data included in the image represented by the digitized video signal from source 600, leaving only the "interesting" data to be further operated on and forwarded to computer 102.

Further, video signal source 600 may take more complex forms than that shown in FIG. 8a. For instance, as shown in FIG. 8b, the spatial frequency spectrum of the video signal from imager means 106 may be analyzed by the structure shown in FIG. 2a, and the digitized video signal from digitized video signal source 600b may be comprised of the output from a selected one of memories 206-0 . . . 206-N. Alternatively, the structure of FIG. 2a may be replaced by that of only FIG. 2 or, even further, by only the A/D and spatial frequency spectrum analyzer of FIG. 2. In these alternative cases a selector switch would be required to select one of the L' or L signals.

Further, video signal source 600b may be comprised of selector switch 802 for selectively deriving the "busy" image video signal either directly from the video signal imager means 106 or from a digitized video signal output from the structure of FIG. 2a.

A still more complex video signal source is shown in FIG. 8c. In this case, a digitized video signal obtained from either FIGS. 8a or 8b is applied as a first input to selector switch 804, while a selected one of the output video signals $G'_0 \ldots G'_{N-1}, G_N$ (FIG. 6) is recursively fed back as a second input to selector switch 804. Selector switch 804 is then operated (either manually or by computer 102) to employ one of these signals as the digitized video signal output from video signal source 600c. The examples of video signal source 600 shown in FIGS. 8a, 8b and 8c are not intended to be exhaustive. For instance, a functional equivalent of the video signal source shown in FIG. 8c, could be implemented by a "fan-out" tree in which each (or even one or only some) of output video signals $G'_0 \ldots G'_{N-1}$ and $G_N$ of a first FIG. 6 structure, is applied as an input video signal to its own separate additional FIG. 6 structure.

When a more complex form of video signal source 600 is employed, in some cases it may be desirable to derive the "busy" video signal for the display from the computer or a memory associated with the computer, rather than from the video signal source itself.

As shown in FIG. 6a, the embodiment of FIG. 6 may be modified in the manner similar to modification of the FIG. 2 embodiment in FIG. 2a. Specifically, each of the respective video signal outputs $G'_0 \ldots G'_{N-1}, G_N$ from FIG. 6 is applied to a corresponding one of $P'_x \cdot P'_y$ memories 612-0 . . . 612-(N−1) and 612-N. The respective outputs from these memories 612-0 . . . 612-N are applied as inputs to selector switch 614, which, in response to a switch control signal from computer 102, applies a selected one of the inputs thereto to computer 102.

It is believed preferable to implement the present invention employing digital components, rather than analog components. For this reason, the preferred embodiments of the invention described above are implemented with digital components. However, it should be understood that there is nothing that precludes the present invention from being implemented with analog components.

Further, while imager means 106 is described as being comprised of a monochrome or color television camera, which is usually the case, the input video signal may also be derived from other types of imager means, such as infra-red imager means, X-ray imager means, imager means employing an array of pressure sensors to provide an image of a two-dimensional tactile field (e.g., surface texture), etc.

What is claimed is:

1. An image data reduction method for use with an input video signal representing a relatively high-spatial-resolution, wide-field-of-view image that is comprised of a first given number of pixels, said method comprising the steps of:

first processing said input video signal to derive therefrom (1) a certain output video signal representing a derived relatively low-spatial-resolution image having a given field-of-view that corresponds to the field of the image represented by said input video signal, said image represented by said certain video signal being comprised of a second given number of pixels smaller than said first given number, and (2) at least one other output video signal representing a derived image having said given field-of-view, said image represented by said one other output video signal exhibiting a resolution equal to or less than said relatively high-spatial-resolution image represented by said input video signal but larger than said relatively low-spatial-resolution derived image represented by said certain output video signal, and said derived image represented by said one other output video signal being comprised of a number of pixels that is equal to or less than said first given number but larger than said second given number; and then further processing said one other output video signal to reduce the number of pixels of the derived image represented thereby by passing a spatially-localized subset of pixels thereof through a spatial window, said subset being comprised of no greater number of pixels than said second given number.

2. The method defined in claim 1, further including the step of:

selectively moving the spatial position of said spatial window within the wide-field-of-view of the derived image represented by said certain output video signal.

3. The method defined in claim 1, wherein:

said first processing step includes the step of deriving from said input video signal an ordinarily-arranged group of a plural number of said other video signals, each other video signal of said group preceding the last other video signal in said group representing a derived wide-field-of-view image exhibiting a higher resolution and a larger number of pixels than the image represented by its next succeeding other video signal in said group, and said last other video signal in said group representing a derived wide-field-of-view image exhibiting a higher resolution and a larger number of pixels than the image represented by said certain video signal; and said further processing step includes the step of further processing each of said plural number of said other output video signals of said group by passing a spatially-localized subset of pixels of that other output video signal through its own separate spatial window, each of said subsets being comprised of no greater number of pixels than said second given number.

4. The method defined in claim 3 further including the step of:

selectively moving the spatial position of each of said windows.

5. The method defined in claim 4, wherein step of selectively moving comprises the step of:

selectively moving the spatial position of each of said windows independently of one another.

6. The method defined in claim 3, wherein each of said subsets is composed of said second given number of pixels.

7. The method defined in claim 1, wherein:

said first processing step comprises the step of analyzing the spatial-frequency spectrum of said image represented by said input video signal to derive a plural number of separate video signals that represent an ordinally-arranged group of contiguous subspectra bands of said image spatial frequency spectrum, in which said first band exhibits the highest resolution of all bands of said group and each band of said group succeeding said first band exhibits a lower spatial resolution than its immediately preceding band of said group, and said separate video signal that represents the last band of said group constitutes said certain video signal and a given ordinal one of said bands of said group preceding said last band thereof constitutes said one other video signal.

8. The method defined in claim 7, wherein said further processing step comprises the step of further processing each of those separate video signals that represent a band of said group that precedes said last band of said group by passing a spatially-localized subset of pixels of that separate video signal through its own separate spatial window, each of said subsets being comprised of no greater number of pixels than said second given number.

9. The method defined in claim 8 further including the step of:

selectively moving the spatial position of each of said windows.

10. The method defined in claim 9, wherein step of selectively moving comprises the step of:

selectively moving the spatial position of each of said windows independently of one another.

11. The method defined in claim 10, wherein each of said subsets is composed of said second given number of pixels.

12. The method defined in claim 1, wherein said first processing step includes the steps of:

detecting features-of-interest contained in the image represented by said input video signal thereby to derive a detected video signal representing a high-resolution feature-of-interest image defining substantially solely the relative spatial positions of the pixels in the image area occupied by those predetermined features of the image represented by the input video signal which are of interest, whereby only those pixels of said detected video signal which define a detected feature-of-interest have significant level values of either positive or negative polarity with respect to a zero-level value;

processing said detected video signal to derive an absolute-level-value video signal in which each pixel thereof has an absolute level value in accordance with a certain transfer function of the significant level value of a corresponding pixel of said detected video signal; and processing said absolute-level-value video signal to derive respectively said certain output video signal and said one other output video signal.

13. The method defined in claim 12, wherein:

said step of processing said detected video signal includes substituting a zero-level value pixel for each of those pixels of said detected video signal which have an absolute-value below a predetermined non-zero threshold absolute-value level.

14. The method defined in claim 12, wherein said feature-of-interest is comprised of a moving object situated within the spatial-region area of the image represented by said input video signal.

15. The method defined in claim 12, wherein said feature-of-interest is comprised of a predetermined pattern shape object situated within the spatial-region area of the image represented by said input video signal.

16. The method defined in claim 12, wherein said feature-of-interest is comprised of an object having a predetermined spatial orientation situated within the spatial-region area of the image represented by said input video signal.

17. The method defined in claim 12, wherein:

said step of processing said absolute-level-value video signal includes the step of low-pass filtering and decimation to reduce the high resolution and pixel density of said first given number of pixels of the image represented thereby to the low resolution and pixel density of said second given number of pixels of the image represented by said certain output video signal.

18. The method defined in claim 17, wherein:

said step of processing said absolute-level-value video signal includes the step of cascaded low-pass filtering and decimation of said absolute-level-value video signal a given number of times to derive thereby an ordinally-arranged group comprised of a plural number of other output video signals and said certain output video signal, in which (a) said first other output video signal in said group represents an image exhibiting the same high resolution and pixel density of said first given number as the image represented by said absolute-level-value video signal, (b) each other output video signal except said first other output video signal in said group represents an image exhibiting a lower resolution and pixel density than the image represented by its immediately preceding other output video signal in said group, and (c) said last other output video signal in said group represents an image exhibiting a higher resolution and pixel density than the low resolution and pixel density of said second given number of the image represented by said certain output video signal; and said further processing step includes the step of further processing each of said plural number of said other output video signals of said group by passing a spatially-localized subset of pixels of that other output video signal through its own separate spatial window, each of said subsets being comprised of no greater number of pixels than said second given number.

19. The method defined in claim 18, wherein each of said windows is movable and further including the steps of:
   displaying a relatively busy image derived from said input video signal,
   employing said certain video output signal and said plural number of other output video signals after said further processing thereof to selectively move said windows to localize the spatial position of a detected feature-of-interest in said displayed busy image and then to generate in accordance therewith a feature spatial position indicator symbol video signal that designates said localized spatial position, and
   employing said symbol video signal to superimpose a display of said symbol at the localized spatial position occupied by a detected feature-of-interest in the displayed busy image.

20. The method defined in claim 12, wherein each of said windows is movable and further including the steps of:
   displaying a relatively busy image derived from said input video signal,
   employing said certain video output signal and said one other output video signals after said further processing thereof to selectively move said windows to localize the spatial position of a detected feature-of interest in said displayed busy image and then to generate in accordance therewith a feature spatial position indicator symbol video signal that designates said localized spatial position, and
   employing said symbol video signal to superimpose a display of said symbol at the localized spatial position occupied by a detected feature-of-interest in the displayed busy image.

21. A foveated electronic camera for deriving a data-reduced video output, said camera comprising:
   a high-resolution, wide field-of-view imager means for deriving in real time an input video signal representing all the pixels of each of successive image frames of the spatial region being viewed by said imager means, each image frame represented by said input video signal being comprised of a first given number of pixels;
   first means for processing said input video signal to derive therefrom (1) a certain output video signal representing respective derived relatively low-spatial-resolution image frames each of which has a given field-of-view that corresponds to the field of each successive image frame represented by said input video signal, each image frame represented by said certain video signal being comprised of a second given number of pixels smaller than said first given number, and (2) at least one other output video signal representing respective derived image frames each of which has said given field-of-view, each image frame represented by said one other output video signal exhibiting a resolution equal to or less than each relatively high-spatial-resolution image frame represented by said input video signal but larger than each relatively low-spatial-resolution derived image frame represented by said certain output video signal, and each derived image frame represented by said one other output video signal being comprised of a number of pixels that is equal to or less than said first given number but larger than said second given number; and
   second means for further processing said one other output video signal to reduce the number of pixels of each derived image frame represented thereby by passing a spatially-localized subset of pixels thereof through a spatial window, said subset being comprised of no greater number of pixels than said second given number.

22. The camera defined in claim 21, wherein said camera is adapted to be used with an image-processing computer responsive to the video output from said camera for deriving at least one camera-control signal, and
   said second means includes window means responsive to said one camera-control signal applied thereto for selectively moving the spatial position of said spatial window within the wide-field-of-view of the derived image represented by said certain output video signal.

23. The camera defined in claim 21 wherein:
   said first processing means comprises means for analyzing the spatial-frequency spectrum of said image represented by said input video signal to derive a plural number of separate video signals that represent an ordinally-arranged group of contiguous subspectra bands of said image spatial frequency spectrum, in which said first band exhibits the highest resolution of all bands of said group and each band of said group succeeding said first band exhibits a lower spatial resolution than its immediately preceding band of said group, and said separate video signal that represents the last band of said group constitutes said certain video signal and a given ordinal one of said bands of said group preceding said last band thereof constitutes said one other video signal.

24. The camera defined in claim 23, wherein said second means comprises window means for further processing each of those separate video signals that represent a band of said group that precedes said last band of said group by passing a spatially-localized subset of pixels of that separate video signal through its own separate spatial window, each of said subsets being comprised of no greater number of pixels than said second given number.

25. The camera defined in claim 24, wherein said camera is adapted to be used with an image-processing computer responsive to said video output from said camera for deriving camera-control signals; and
   said window means includes means responsive to at least one of said camera-control signals applied thereto for selectively moving the spatial position of said movable windows within the wide field of view defined by the pixels of said last band.

26. The camera defined in claim 25, wherein:
   said camera-control signals include a separate control signal corresponding to the movable window for each one of said individual bands; and
   said window means includes means responsive to each of said separate control signals for selectively moving said spatial position of each of said movable windows independently of one another.

27. The camera defined in claim 24, wherein each of said subsets is composed of said second given number of pixels.

28. The camera defined in claim 24, wherein said second means further includes:

memory means for storing both said second given number of pixels forming the subset from each of said movable windows and said second given number of pixels from said last band of said group; and selector switch means responsive to a camera-control signal applied thereto for selectively forwarding the stored second given nubmer of pixels corresponding to solely one of the subsets or said last band of said group as said video output from said camera.

29. The camera defined in claim 23, wherein said analyzing means is a Burt-Pyramid analyzer.

30. The camera defined n claim 23, wherein said analyzing means is a filter-subtract-decimate (FSD) analyzer.

31. The camera defined in claim 21, wherein said first processing means includes an analog-to-digital converter for representing the level of each pixel of said input video signal as a multibit number.

32. The camera defined in claim 21, wherein said first processing means includes:

a feature-of-interest detector for detecting features-of-interest contained in the image represented by said input video signal thereby to derive a detected video signal representing a high-resolution feature-of-interest image defining substantially solely the relative positions of the pixels in the image area occupied by those predetermined features of the image represented by the input video signal which are of interest, whereby only those pixels of said detected video signal which define a detected feature-of-interest have significant level values of either positive or negative polarity with respect to a zero-level value;

pixel absolute value transfer-function means for processing said detected video signal to derive an absolute-level-value video signal in which each pixel thereof has an absolute level value in accordance with a certain transfer function of the significant level value of a corresponding pixel of said detected video signal; and a low-pass convolution filter/decimator pyramid means for processing said absolute-level-value video signal to derive respectively a given plurality of output video signals including said certain output video signal and said one other output video signal.

33. The camera defined in claim 32, wherein:

said pixel absolute value transfer-function means includes substituting a zero-level value pixel for each of those pixels of said detected video signal which have an absolute-value level below a predetermined non-zero threshold absolute-value level.

34. The camera defined in claim 32, wherein said feature-of-interest detector is comprised of a moving-object detector for detecting a moving object situated within the spatial-region area of the image represented by said input video signal.

35. The camera defined in claim 32, wherein said feature-of-interest detector is comprised of a pattern-shape detector for detecting a predetermined-pattern shape object situated within the spatial-region area of the image represented by said input video signal.

36. The camera defined in claim 32, wherein said feature-of-interest detector is comprised of an oriented filter for detecting an object having a predetermined spatial orientation situated within the spatial-region area of the image represented by said input video signal.

37. The camera defined in claim 32, wherein:

said first processing means includes a video signal source for deriving a digitized video signal input to said feature-of-interest detector, said video signal source including a selector switch for deriving said digitized video signal from said input video signal in one switch position of said selector switch and for recursively deriving said digitized video signal from the video output from said camera in another switch position of said detector switch.

38. The camera defined in claim 32, wherein said camera is adapted to be used with an image-processing computer responsive to the video output from said camera for deriving camera-control signals; and said second means comprises window means for further processing each separate other output video signal contained in said given plurality of output video signals from said convolution filter/decimator pyramid means by passing a spatially-localized subset of pixels of that separate other output video signal through its own separate movable spatial window, each of said subsets being comprised of no greater number of pixels then said second given number, and said window means includes means responsive to each of a separate one of said camera-control signals for selectively moving the spatial position of each of said movable windows within the field of the image represented by said certain video output signal.

39. The camera defined in claim 38, wherein said camera is adapted to be used with display means for displaying a relatively busy image derived from said video input signal; and and said computer in response to video output signals passed by said movable windows respectively derives eachof said separate camera-control signals to selectively move said windows to spatially localize the spatial position of a detected feature-of-interest in said displayed busy image and in accordance therewith generating a feature spatial position-indicator symbol superimposed on the localized spatial position occupied by a detected feature-of-interest in the displayed busy image.

40. The camera defined in claim 38, wherein each of said subsets is composed of said second given number of pixels.

41. The camera defined in claim 38, wherein said second means further includes:

memory means for storing both said second given number of pixels forming the subset from each of said movable windows and said second given number of pixels from said last band of said group, and selector switch means responsive to a camera-control signal applied thereto for selectively forwarding the stored second given number of pixels corresponding to solely one of the subsets or said last band of said group as said video output from said camera.

* * * * *

UNITED STATES PATENT AND TRADEMARK OFFICE
CERTIFICATE OF CORRECTION

PATENT NO. : 4,692,806

DATED : Sep. 8, 1987

INVENTOR(S) : Charles H. Anderson et al.

It is certified that error appears in the above-identified patent and that said Letters Patent is hereby corrected as shown below:

Front cover page, item [75], change "both" to --Peter J. Burt, Mercer County, all--

Col. 13, line 20, "$G'_0$" should be --$G'_1$--

Col. 21, line 7, "nubmer" should be --number--.

Signed and Sealed this

Ninth Day of February, 1988

Attest:

DONALD J. QUIGG

*Attesting Officer*  *Commissioner of Patents and Trademarks*